Patented July 27, 1954

2,684,962

UNITED STATES PATENT OFFICE 2,684,962

3-β HYDROXYALKYL-3,(1) BENZ-2-3-4-5 TETRAHYDRO-AZEPINES

Lewis A. Walter, Madison, N. J., assignor to Maltbie Laboratories, Inc., Newark, N. J., a corporation of New Jersey No Drawing. Application March 5, 1953, Serial No. 340,670

6 Claims. (Cl. 260—239)

My present invention relates to new and useful compositions of matter, namely, those consisting wholly or in part of 3-β- hydroxyalkyl-3,(1) benz-2-3-4-5 tetrahydro-azepines. These compounds are represented by the formula—

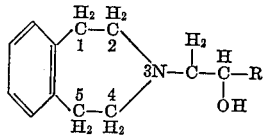

wherein R represents hydrogen or a saturated lower alkyl group or radical. Being organic bases, in view of the amino nitrogen atom, these compounds readily form salts with organic and inorganic acids. Such salts, wherein the acid is non-toxic acid and wherein the hydrogen and acid radical are both connected to the nitrogen atom of the nucleus in the formula aforesaid, such as the hydrochloride, sulfate, phosphate, acetate, citrate and possibly others, are also to be considered within the purview of the present invention. The —OH group in the formula aforesaid is also reactive with certain organic acids, such, for example, as acetic acid to form esters. These esters formed with non-toxic organic acids are further to be considered within the purview of the present invention.

These compounds, including the salts and esters as aforesaid, when tested pharmacologically have been found to possess valuable pharmacological properties. The compounds of the present invention generally have adrenolytic properties. For example, the compound of the formula given above in which R=H is useful as an andrenolytic and is also useful as an analgesic of the morphine type; and the compound specifically set forth in Example III which follows is also useful as an adrenolytic and has some additional utility as an analgesic of the morphine type.

Certain of these compounds may be prepared as set forth in detail in the examples which follow. These processes for the preparation, with suitable variations as will occur to those skilled in the art, may be used in the preparation of all the compounds according to the present invention.

The following specific examples are illustrative of the novel compounds according to the present invention, and of suitable methods for their preparation.

Example I 3 (β-hydroxyethyl) 3,(1) benz-2,3,4,5 tetrahydroazepine having the formula—

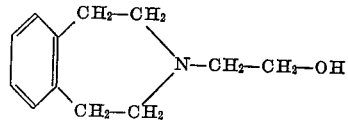

Thirty grams of 3,(1) benz-2,3,4,5 tetrahydroazepine and 10 g. of ethylene oxide were dissolved in 100 ml. dry dioxane and tightly sealed in a flask. After keeping it at room temperature for several days, the mixture was fractionally distilled to give 30 g. of the compound having the structural formula above, B. P. 120°–125° C. at about 1 mm. This material crystallized in the receiver and was recrystallized from absolute alcohol. It melted at 87°–88° C.

It was converted into the hydrochloride salt, M. P. 170°–172° C. by treatment with the theoretical amount of hydrogen chloride dissolved in absolute alcohol.

Example II 3 (β-hydroxypropyl) 3,(1) benz-2,3,4,5 tetrahydroazepine having the formula—

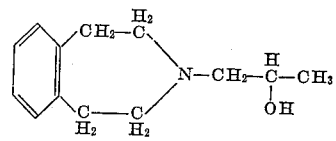

Thirty grams of 3,(1) benz-2,3,4,5 tetrahydroazepine and 11.5 g. of propylene oxide in 50 ml. of dry dioxane were sealed in a flask and kept at room temperature for several days. Some of the desired product according to the formula above crystallized out and was filtered off. The mother liquor was fractionally distilled to give some additional product, B. P. 130°–135° C. at 1 mm. The combined product material obtained as aforesaid was crystallized from absolute alcohol to give the pure compound having the structural formula above, M. P. 120°–121° C.

This material was converted to the hydrochloride salt, M. P. 187°–189° C. uncorrected, by treatment with the theoretical amount of hydrogen chloride dissolved in absolute alcohol.

Example III 3 (β-acetoxyethyl) 3,(1) benz-2,3,4,5 tetrahydroazepine hydrochloride having the formula—

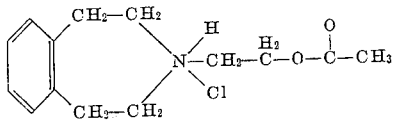

Thirty grams of 3-(β - hydroxyethyl) - 3,(1) benz - 2,3,4,5 tetrahydro - azepine hydrochloride (the product of Example I) was added to 150 ml. of acetic anhydride and one drop of concentrated hydrochloric acid was added. The mixture was warmed on the steam bath for half an hour at which time all the material was in solution. The cooled solution was diluted with ether and the salt of the compound having the structural formula given above crystallized out. It was filtered off and recrystallized from absolute alcohol to give the pure material, M. P. 197°–199° C. uncorrected.

Example IV 3-(β-propionoxyethyl)-3,(1) benz-2,3,4,5 tetrahydro-azepine hydrochloride having the formula—

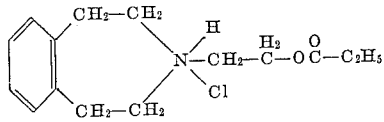

This compound was prepared by using propionic anhydride instead of acetic anhydride as described in Example III. It melted at 196°–198° C. uncorrected.

Example V 3-(β-acetoxypropyl)-3,(1) benz-2,3,4,5 tetrahydroazepine hydrochloride, having the formula—

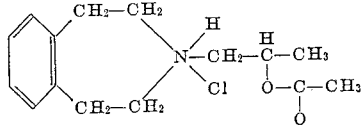

Five grams of 3-(β-hydroxypropyl)-3,(1) benz-2,3,4,5 tetrahydro-azepine (the product of Example II) was added to 25 ml. of acetic anhydride. After adding one drop of concentrated hydrochloric acid, the mixture was heated on a steam bath for half an hour. The cooled solution was diluted with ether; and the salt of the compound having the above structural formula crystallized. It was filtered off and recrystallized from absolute alcohol, M. P. 194°–195° C. uncorrected.

This is a continuation-in-part of my co-pending application Ser. No. 238,005, filed July 21, 1951, now abandoned.

From the teachings of the above examples, it will be obvious to those skilled in the art how to prepare other similar compounds coming within the scope of the broader claims. All such similar compounds which are useful as pharmaceuticals in a manner similar to those illustrated in the specific examples hereinabove given, are to be considered as embraced within the scope of the present invention.

What is claimed is:

1. A compound of the class consisting of azepines of the formula—

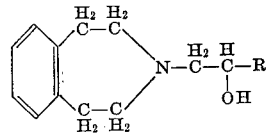

where R is selected from the group consisting of hydrogen and saturated lower alkyl radicals; and the hydrochloride salts and esters of said azepines of said formula with saturated, lower alkyl, carboxylic acids.

2. A compound having the formula—

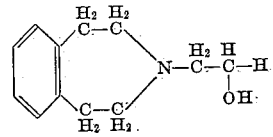

3. A compound having the formula—

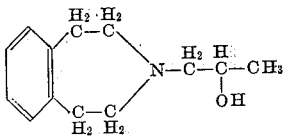

4. A compound having the formula—

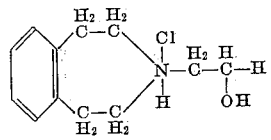

5. A compound having the formula—

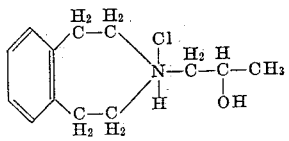

6. A compound having the formula—

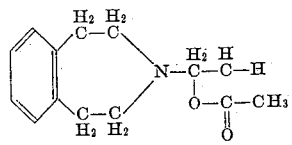

No references cited.